(12) United States Patent
Sarafianos et al.

(10) Patent No.: US 11,270,957 B2
(45) Date of Patent: Mar. 8, 2022

(54) METHOD FOR DETECTING A BREACH OF THE INTEGRITY OF A SEMICONDUCTOR SUBSTRATE OF AN INTEGRATED CIRCUIT FROM ITS REAR FACE, AND CORRESPONDING DEVICE

(71) Applicant: STMicroelectronics (Rousset) SAS, Rousset (FR)

(72) Inventors: Alexandre Sarafianos, Pourrieres (FR); Bruno Nicolas, Aubagne (FR); Daniele Fronte, Rousset (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 311 days.

(21) Appl. No.: 16/267,573

(22) Filed: Feb. 5, 2019

(65) Prior Publication Data

US 2019/0244915 A1 Aug. 8, 2019

(30) Foreign Application Priority Data

Feb. 7, 2018 (FR) ........................................ 1851011

(51) Int. Cl.
| | | |
|---|---|---|
| H01L 23/00 | (2006.01) | |
| G06F 21/77 | (2013.01) | |
| G06F 21/75 | (2013.01) | |
| G06K 19/073 | (2006.01) | |

(52) U.S. Cl.
CPC ............ *H01L 23/57* (2013.01); *G06F 21/75* (2013.01); *G06F 21/77* (2013.01); *G06K 19/07372* (2013.01); *H01L 23/576* (2013.01)

(58) Field of Classification Search
CPC ........... H01L 23/57; G06F 21/75; G06F 21/77

USPC ........................................................ 726/34
See application file for complete search history.

(56) References Cited

U.S. PATENT DOCUMENTS

| 2004/0119593 | A1* | 6/2004 | Kuhns | ................. G06K 19/027 340/572.7 |
|---|---|---|---|---|
| 2005/0230049 | A1 | 10/2005 | Nishio et al. | |
| 2006/0049941 | A1* | 3/2006 | Hunter | ................. G08B 13/128 340/545.6 |

(Continued)

FOREIGN PATENT DOCUMENTS

| CN | 101027766 A | 8/2007 |
|---|---|---|
| CN | 101410969 A | 4/2009 |

(Continued)

OTHER PUBLICATIONS

Paul et al., "Tamper Protection for Security Devices", IEEE, doi: 10.1109/BLISS.2008.27, 2008, pp. 92-96. (Year: 2008).*

(Continued)

*Primary Examiner* — Peter G Shaw
(74) *Attorney, Agent, or Firm* — Crowe & Dunlevy

(57) ABSTRACT

A semiconductor substrate of an integrated circuit is protected by a coating. The semiconductor includes a front face and a rear face. To detect a breach of the integrity of a semiconductor substrate of an integrated circuit from the rear face, an opening of the coating facing the rear face of the substrate is detected. In response thereto, an alarm is generated. The detection is performed by making resistance measurements with respect to the semiconductor substrate and comparing the measured resistance to a nominal resistive value of the semiconductor substrate.

17 Claims, 4 Drawing Sheets

(56) References Cited

U.S. PATENT DOCUMENTS

| | | | |
|---|---|---|---|
| 2007/0023860 A1 | 2/2007 | Kim et al. | |
| 2008/0278217 A1* | 11/2008 | Hankhofer | H05K 1/0275 |
| | | | 327/509 |
| 2010/0187527 A1* | 7/2010 | Van Geloven | H01L 24/73 |
| | | | 257/48 |
| 2011/0210956 A1 | 9/2011 | Girdhar et al. | |
| 2013/0193437 A1 | 8/2013 | Lisart et al. | |
| 2014/0138686 A1 | 5/2014 | Wuidart et al. | |
| 2014/0266265 A1* | 9/2014 | Kuhn | G01N 27/205 |
| | | | 324/693 |
| 2016/0042199 A1 | 2/2016 | Joharapurkar et al. | |
| 2016/0133581 A1* | 5/2016 | Cabral, Jr | H01L 23/345 |
| | | | 327/534 |
| 2017/0373024 A1* | 12/2017 | Graf | H01L 24/49 |
| 2018/0247901 A1 | 8/2018 | Marzaki | |
| 2019/0043814 A1 | 2/2019 | Marzaki et al. | |
| 2019/0081011 A1 | 3/2019 | Sarafianos et al. | |
| 2019/0109100 A1 | 4/2019 | Sarafianos et al. | |
| 2019/0244915 A1 | 8/2019 | Sarafianos et al. | |

FOREIGN PATENT DOCUMENTS

| | | |
|---|---|---|
| CN | 101819941 A | 9/2010 |
| CN | 101924097 A | 12/2010 |
| CN | 102157363 A | 8/2011 |
| CN | 106558581 A | 4/2017 |
| CN | 107104062 A | 8/2017 |
| CN | 105374758 B | 12/2019 |
| DE | 102016116228 A1 | 8/2017 |
| FR | 2986356 A1 | 8/2013 |
| FR | 2998419 A1 | 5/2014 |
| FR | 3063385 A1 | 8/2018 |
| JP | 200564498 A | 3/2005 |
| WO | 2006131427 A2 | 12/2006 |
| WO | 2009016589 A2 | 2/2009 |

OTHER PUBLICATIONS

Pope et al., "Trusted Integrated Circuit Strategy", IEEE, doi: 10.1109/TCAPT.2008.918319, pp. 230-234, Mar. 2008. (Year: 2008).*
First Office Action and Search Report from co-pending CN Appl. No. 201910075225.6 dated Dec. 3, 2020 (15 pages).
Second Office Action and Search Report for co-pending CN Appl. No. 201910075225.6 dated Jul. 5, 2021 (9 pages).
INPI Search Report and Written Opinion for FR 1851011 dated Oct. 22, 2018 (8 pages).
Third Office Action and Search Report for co-pending CN Appl. No. 201910075225.6 (which claims priority to the Instant US application), dated Oct. 29, 2021, 6 pages—no translation available.

* cited by examiner

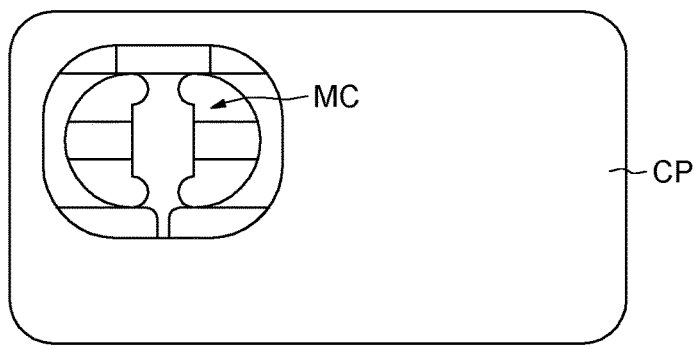
FIG.1A
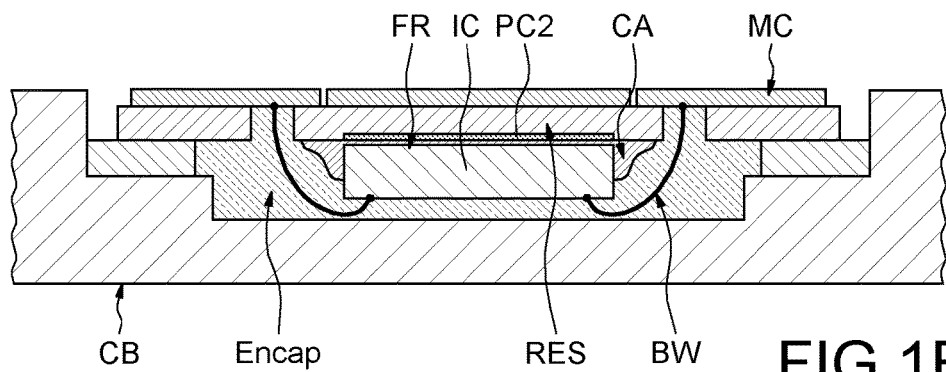
FIG.1B
FIG.2
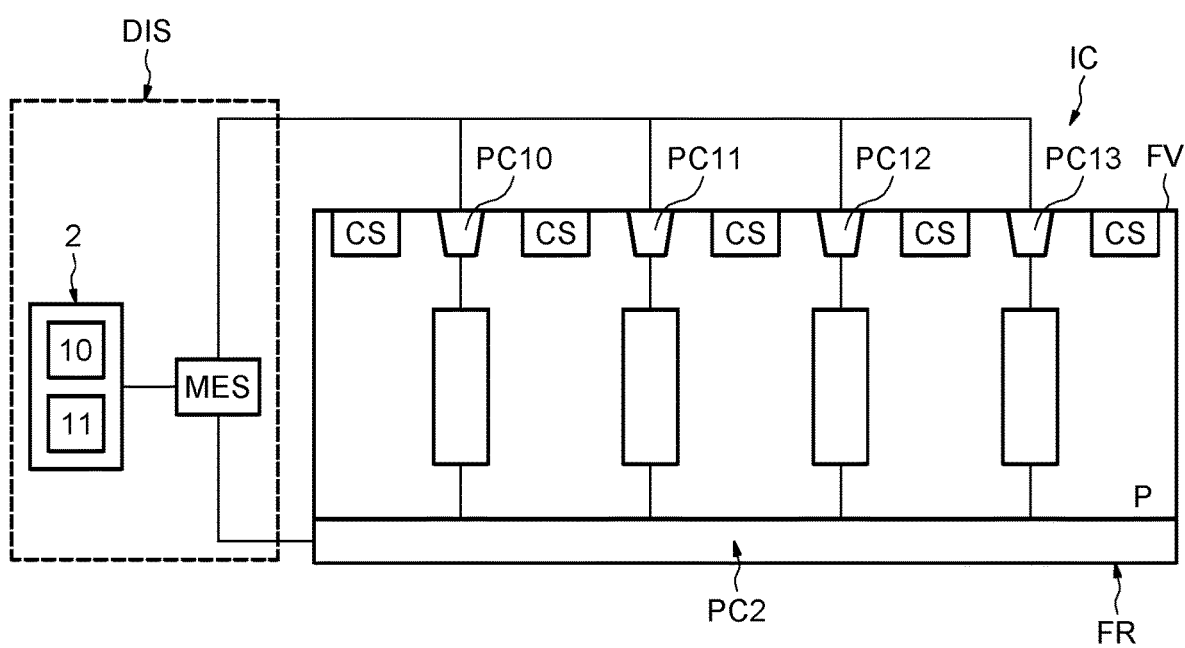

METHOD FOR DETECTING A BREACH OF THE INTEGRITY OF A SEMICONDUCTOR SUBSTRATE OF AN INTEGRATED CIRCUIT FROM ITS REAR FACE, AND CORRESPONDING DEVICE

PRIORITY CLAIM

This application claims the priority benefit of French Application for Patent No. 1851011, filed on Feb. 7, 2018, the content of which is hereby incorporated by reference in its entirety to the maximum extent allowable by law.

TECHNICAL FIELD

The embodiments and the implementation relate to integrated circuits and, more specifically, to the detection of a possible attack on the integrity of the substrate of an integrated circuit.

BACKGROUND

Integrated circuits, particularly those equipped with memories containing sensitive information, must be, as far as possible, protected against attacks, particularly attacks that are intended to discover stored data.

Among the possible attacks for extracting confidential data from a memory of an integrated circuit, for example, a protected memory of a smart card, attacks called fault injection attacks (DFA for Differential Fault Analysis) can be cited that attempt to disrupt the operation and/or the content of the memory or even to modify the operating logic of the circuit, for example, by means of radiation (laser, infrared, x-ray, etc.) emitted through the rear face of the chip.

These attacks can be carried out, for example, by means of a Focus Ion Beam (FIB), using a focus ion beam to machine or deposit materials in the nanometric range.

The effectiveness of these attacks increases when the substrate of the integrated circuit is thinned by the attacker from its rear face so as to draw as close as possible to the components of the integrated circuit that are produced in the vicinity of its front face.

An initial step for such thinning can comprise, for example, mechanical or chemical-mechanical polishing from the rear face.

Therefore, seeking to protect the integrated circuit against an attack from the rear face of the substrate is particularly worthwhile.

A requirement exists for being able to detect a breach of the integrity of the substrate from its rear face, allowing the integrated circuits to be protected against this type of attack.

SUMMARY

According to embodiments, it is proposed that this requirement is met with a solution that is simple to implement, guarantees better security and requires a low surface area in order to be produced on the semiconductor substrate.

According to one aspect, a method is proposed for detecting a breach of the integrity of a semiconductor substrate of an integrated circuit protected by a coating, the substrate comprising a front face and a rear face, this breach being liable to be made from the rear face of the substrate, the method comprising detecting the opening of the coating facing the rear face of the substrate.

Thus, detecting the opening of the coating advantageously allows an attack to be rapidly detected, for example as soon as it begins.

According to one embodiment, the method comprises fixing an electrically conductive wafer to the inside of the coating, on the rear face, and said detection comprises detecting the removal of at least part of said electrically conductive wafer.

Thus, a particularly simple way of detecting the opening of the coating provides for the use of a wafer inside the coating and for the detection of at least partial removal of the wafer.

According to one embodiment, said detection comprises a first measurement of a resistive value of the substrate between a set of n contacts mutually electrically coupled together and distributed over the front face and the electrically conductive wafer.

The term "contact" is understood to mean substrate contacts conventionally present in the embodiments of integrated circuits and, for example, intended for biasing the substrate.

These contacts can be produced by installing overdoped areas distributed over the front face of the substrate.

The resistive measurement of the substrate carried out on n contacts corresponds to a measurement of the equivalent resistive value of N resistors (each resulting from the resistivity of the substrate) connected in parallel. A nominal resistive value according to this measurement thus decreases by $1/N$.

The term "nominal resistive value" is understood to mean the resistive value that is reasonably expected during a measurement carried out on a structure that has not experienced a breach of its integrity.

The integer number N advantageously is selected so that the corresponding nominal resistive value is low enough to easily detect an increase in the measured resistive value, resulting, for example, from the removal of the electrically conductive wafer.

A person skilled in the art would know to select the number N particularly as a function of the nature of the substrate and its dimensions.

By way of an example, for a conventional substrate made of silicon with a surface area of $1\times1$ mm$^2$, N can be approximately 500.

Thus, this measurement allows the removal of the electrically conductive wafer to be detected. This measurement also allows the removal of a portion of the electrically conductive wafer to be detected.

According to one embodiment, the method further comprises detecting thinning of the substrate from the rear face.

According to one embodiment, detecting thinning comprises a second measurement of a resistive value of the substrate between a set of M contacts and the electrically conductive wafer.

For example, in one embodiment, in which detection of thinning comprises the first and the second measurement, the number M advantageously is less than N.

Similarly, a person skilled in the art would know to select the integer number M particularly as a function of the nature of the substrate and of its dimensions.

By way of an example, for a conventional substrate made of silicon with a surface area of $1\times1$ mm$^2$, M can be from approximately 1 to N/10.

According to one embodiment, detection comprises a third measurement of a resistive value of the substrate between at least two contacts.

This third measurement allows advanced thinning of the substrate to be detected between said at least two contacts.

According to one embodiment, the method comprises generating an alarm signal if said resistive value originating from the first measurement is greater than a first nominal resistive value of said substrate.

The term "alarm signal" is understood to mean, for example, a signal allowing conventional countermeasure means to be triggered that are intended to counteract such an attack or even to stop the operation of the integrated circuit.

In other words, if the measured resistive value is greater than said first nominal resistive value of the substrate, the opening of the coating opposite the rear face of the substrate is detected and an alarm signal is generated.

According to one embodiment, the method comprises generating an alarm signal if said resistive value originating from the second measurement is lower than a second nominal resistive value of said substrate.

In other words, if the measured resistive value is lower than said second nominal resistive value of the substrate, thinning of the substrate is detected and an alarm signal is generated.

According to one embodiment, the method comprises generating an alarm signal if said resistive value originating from the third measurement is lower than a first third nominal resistive value of the substrate or is greater than a second third nominal resistive value of the substrate.

The first third nominal resistive value can correspond to a low limit of an interval of third nominal resistive values and the second third nominal resistive value can correspond to a high limit of the interval of third nominal resistive values.

Thus, for example, if the resistive value originating from the third measurement is lower than the first third nominal resistive value, a short circuit can be detected that is made between the two contacts corresponding to the third measurement.

Furthermore, for example, if the resistive value originating from the third measurement is greater than a second third nominal resistive value, an open circuit can be detected between the two contacts corresponding to the third measurement.

Indeed, particularly with the FIB technique, it is possible to deposit conductive materials in order to create a short circuit from one contact to another or to electrically separate two contacts by etching the substrate from the rear face up to, for example, an isolation layer or to the bottom of a well formed on the front face side.

According to another aspect, an integrated circuit is proposed comprising a semiconductor substrate protected by a coating, having a rear face and a front face, and a circuit for detecting a breach of the integrity of said substrate liable to be made from its rear face, configured to detect the opening of the coating facing the rear face of the substrate.

According to one embodiment, the circuit for detecting comprises an electrically conductive wafer fixed on the rear face of the substrate, inside the coating, and a detection circuit configured to detect the removal of at one least part of said electrically conductive wafer.

According to one embodiment, the circuit for detecting comprises contacts mutually electrically coupled together that are distributed over the front face and the detection circuit is configured to carry out a first measurement of a resistive value of the substrate between N contacts and the electrically conductive wafer.

According to one embodiment, the detection circuit is also configured to detect thinning of the substrate from the rear face.

According to one embodiment, in order to detect thinning of the substrate from the rear face, the detection circuit is configured to carry out a second measurement of a resistive value of the substrate between a set of M contacts and the electrically conductive wafer.

According to one embodiment, in order to detect thinning of the substrate from the rear face, the detection circuit is configured to carry out a third measurement of a resistive value of the substrate between at least two contacts.

According to one embodiment, the detection circuit is configured to generate an alarm signal if said resistive value originating from the first measurement is greater than a first nominal resistive value of the substrate.

According to one embodiment, the detection circuit is configured to generate an alarm signal if said resistive value originating from the second measurement is lower than a second nominal resistive value of the substrate.

According to one embodiment, the detection circuit is configured to generate an alarm signal if said resistive value originating from the third measurement is lower than a first third nominal resistive value of the substrate or is greater than a second third nominal resistive value of the substrate.

An electronic device, such as a smart card, is also proposed comprising an integrated circuit as previously described.

BRIEF DESCRIPTION OF THE DRAWINGS

Further advantages and features will become apparent upon reading the detailed description of embodiments, which are by no means limiting, and with reference to the accompanying drawings, in which:

FIGS. 1A and 1B show a smart card and a section view of an integrated circuit equipping a smart card;

FIG. 2 shows an embodiment of the integrated circuit;

DETAILED DESCRIPTION

FIGS. 1A and 1B show an example of an integrated circuit IC equipping a smart card CP.

A typical smart card CP is schematically shown in FIG. 1A. The integrated circuit IC is assembled in the card body CB of the smart card CP under contacts MC. A section view of this assembly is shown in FIG. 1B.

The integrated circuit IC conventionally comprises a semiconductor substrate superposed by an interconnection part (BEOL: Back End Of Line).

The integrated circuit IC is covered with an electrically conductive wafer PC2. This wafer is adhered to the rear face FR of said substrate by an adhesive conductive layer CA and attaches the substrate to a face of a resin base RES.

The resin base RES supports, on its opposite face, contacts MC intended to provide the connections for the integrated circuit IC with a terminal such as a card reader.

The integrated circuit IC is encapsulated in an isolating encapsulation layer Encap.

The isolating encapsulation layer Encap for its part is encapsulated in a card body CB.

The connections between the contacts MC and the integrated circuit IC are provided by means of wires BW, in a typical configuration of the "Flip chip" type, with the wires BW being soldered, on the one hand, to said contacts MC and, on the other hand, to contact pads formed on the final metallization level of the interconnection part.

The assembly formed by the electrically conductive wafer PC2, the adhesive conductive layer CA and the resin RES forms a coating for the integrated circuit IC.

This does not exclude the possibility of using other coatings that are known in the field of integrated circuits, for example, adapted to an application other than a smart card.

FIG. 2 shows an embodiment of the integrated circuit IC.

The integrated circuit IC comprises a semiconductor substrate having a front face FV, a rear face FR and contacts PCi, with i∈{10; 11; 12; 13}, distributed in the vicinity of the front face FV.

Typically, the semiconductor substrate includes semiconductor wells CS electrically isolated from the remainder of the substrate, for example, by a structure of the conventional "triple well" type that is per se known.

In this example, the integrated circuit comprises a detection circuit DIS connected to the electrically conductive wafer PC2 and to the contacts PCi. The detection circuit DIS allows the resistive value of the substrate to be measured between R contacts PCi, with R being defined as a function of the type of measurement to be carried out, and the electrically conductive wafer PC2.

Figure 3:
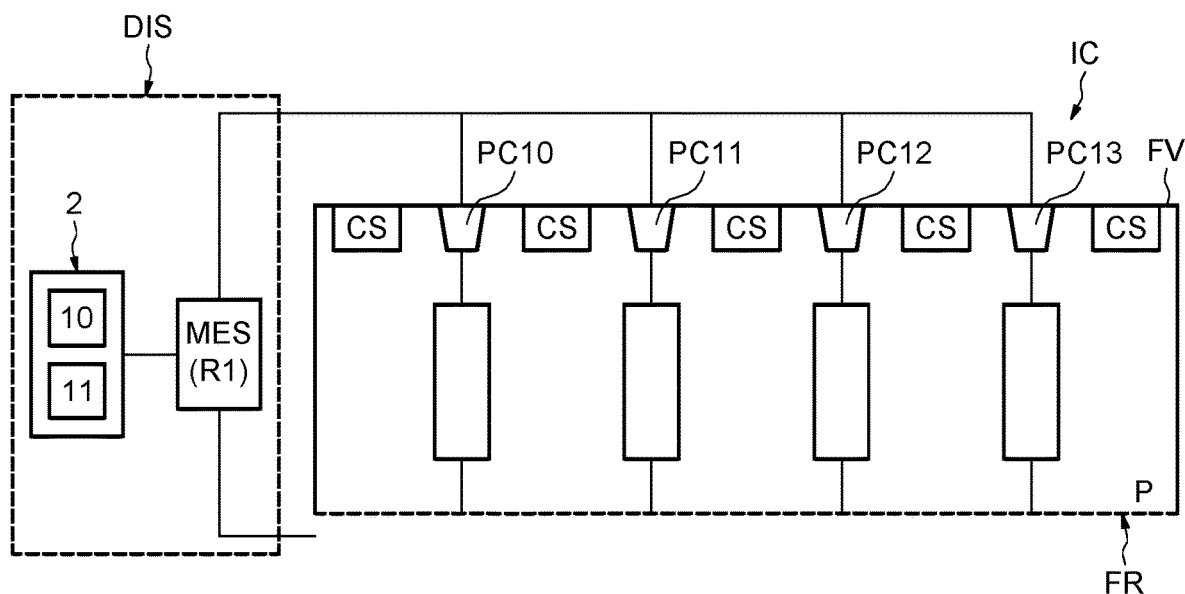
FIG. 3 shows the integrated circuit after its coating has been opened facing the rear face.
Figure 4:
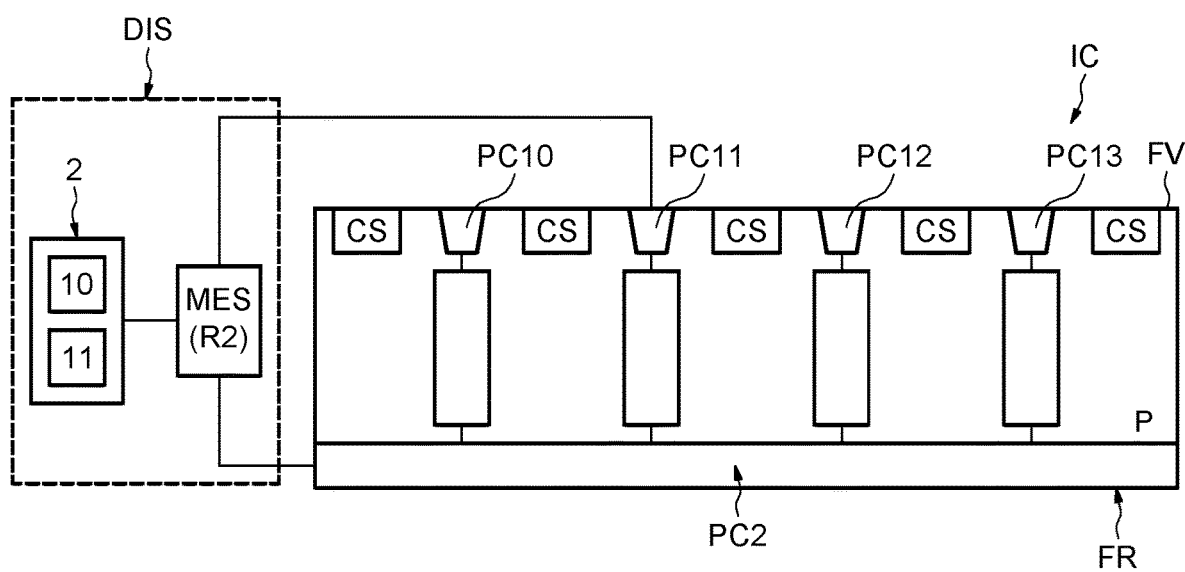
FIG. 4 represents the integrated circuit following thinning of the substrate and introduction of the electrically conductive wafer.

Hereafter, particularly with reference to FIGS. 3 and 4, the integer number R will assume an integer value N during a first measurement and will assume another integer value M during a second measurement.

The detection circuit DIS also allows a third measurement to be carried out of the resistive value of the substrate between the contacts PCi only.

For example, the detection circuit DIS comprises a measurement circuit MES configured to carry out the measurements of said resistive values of the substrate. The measurement circuit, which has a conventional structure, can deliver a physical value representing the resistive value of the substrate, for example, a voltage if a current with a known value is circulated through the substrate between the contacts and the wafer or even a current if a voltage with a known value is applied between the contacts and the wafer.

The detection circuit DIS also comprises two comparison circuits 10, 11 allowing the resistive value of the measured substrate to be compared to a nominal resistive value of the substrate.

In this case, and hereafter, "nominal resistive value" is understood to mean the resistive value that is reasonably expected during a measurement carried out on a structure that has not experienced an attack on its integrity. Various nominal resistive values will be respectively associated with various measurements.

Figure 6:
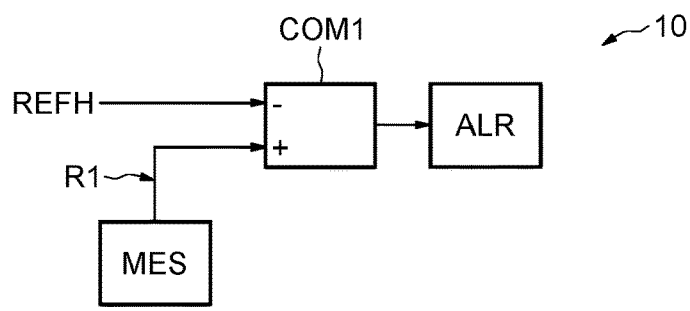
FIG. 6 schematically shows a comparison circuit for implementing the detection of a breach of the integrity of the substrate with respect to a first measurement.
Figure 7:
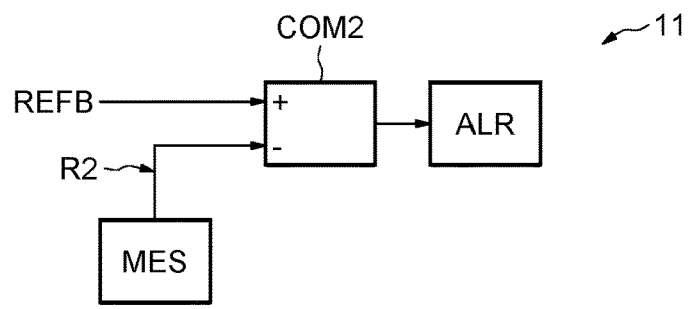
FIG. 7 schematically shows a comparison circuit for implementing the detection of a breach of the integrity of the substrate with respect to a second measurement.
Figure 8:
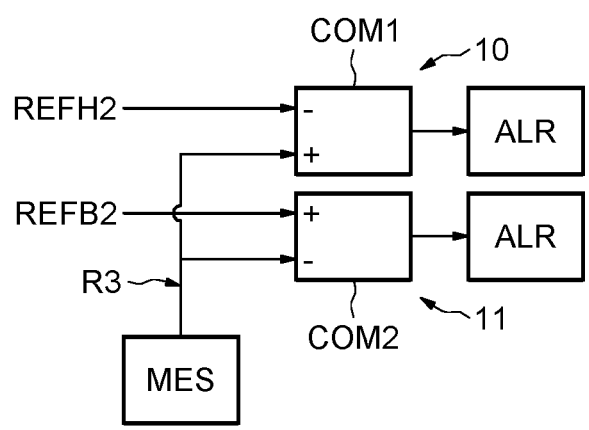
FIG. 8 schematically shows two comparison blocks relative to a third measurement.

The comparison circuits 10, 11 are described hereafter, with reference to FIGS. 6, 7 and 8.

FIG. 3 shows the integrated circuit IC after its coating has been opened facing the rear face FR.

More specifically, the electrically conductive wafer PC2 previously described with reference to FIGS. 1 and 2 has been removed, thus exposing the rear face FR of the substrate.

In this condition, the detection circuit DIS will carry out the first measurement of the resistive value R1 between N contacts corresponding to a measurement of the equivalent resistive value of N resistors connected in parallel and a terminal normally connected to the electrically conductive wafer PC2.

The removal of the electrically conductive wafer PC2 results in a significant increase in the resistance of the substrate.

The integer number N advantageously is selected so that the nominal resistive value corresponding to the first measurement is low enough to easily detect an increase in the measured resistive value. In this example, removing the electrically conductive wafer PC2 results in a very high measured resistive value.

The resistive value R1 of the substrate originating from the first measurement is then sent to the comparison circuit 10 that is configured to compare the resistive value R1 of the substrate originating from the first measurement with a first nominal resistive value of the substrate REFH. If the resistive value R1 of the substrate originating from the first measurement is greater than the first nominal resistive value REFH, the detection circuit has detected the removal of at least one part of said electrically conductive wafer PC2.

FIG. 4 represents the integrated circuit IC following thinning of the substrate and introduction of the electrically conductive wafer PC2.

For example, in order to extract confidential data from a memory of an integrated circuit, an attacker needs to thin the substrate in order to draw as close as possible to the components of the integrated circuit, which are produced in the vicinity of its front face.

Such thinning can comprise, for example, chemical-mechanical polishing from the rear face and/or machining, for example, via a focus ion beam FIB.

After thinning, the attacker can deposit a (replacement) electrically conductive wafer PC2 on the rear face FR.

The thinning of the semiconductor substrate results in a reduction in the resistive value of the substrate between the contacts PCi and the electrically conductive wafer PC2.

In order to detect thinning, the second measurement of the resistive value R2 of the substrate is carried out between M contacts, corresponding to a measurement of the equivalent resistive value of M resistors connected in parallel, and the electrically conductive wafer PC2. A nominal resistive value according to this measurement thus decreases by 1/M.

The second measurement is similar to the first measurement, except that the integer number M advantageously is selected so that the corresponding nominal resistive value is large enough to easily detect a reduction in the measured resistive value.

The geometric distribution of the M contacts over the front face of the substrate advantageously is selected in order to carry out such a measurement. For example, the measurement generally can be carried out in the substrate or sequentially in local areas of the substrate.

The resistive value R2 of the substrate originating from the second measurement is sent to a comparison circuit 11 that is configured to compare the resistive value R2 of the substrate originating from the second measurement with a second nominal resistive value of the substrate REFB. If the resistive value R2 of the substrate originating from the second measurement is lower than said second nominal resistive value REFB, thinning of the substrate is detected by the detection circuit.

Figure 5:
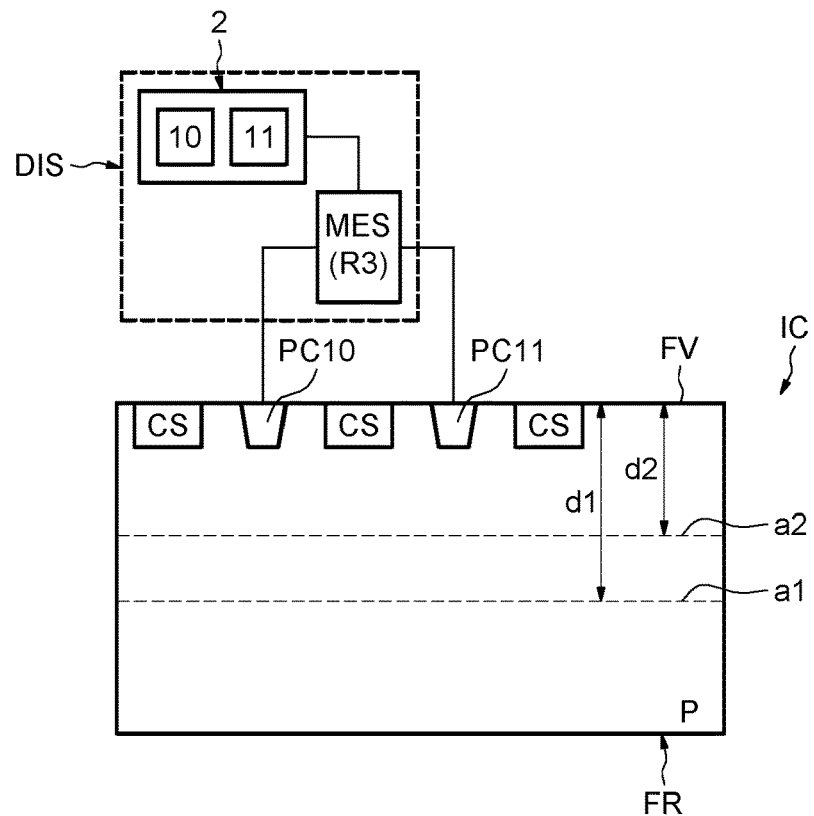
FIG. 5 schematically shows the integrated circuit after several thinning operations.

FIG. 5 schematically shows the integrated circuit IC after several thinning operations a1 and a2 respectively resulting in substrate thicknesses d1 and d2.

If the substrate is thinned in order to draw as close as possible to an area of interest of the circuits formed in the wells CS, it is conceivable that the thinning operation reaches, at least on one part of the substrate, an isolation area, such as the bottom of a well CS or even a lateral isolation area of the Shallow Trench Isolation (STI) type or of the LOCal Oxidation of Silicon (LOCOS) type.

In this case, two contacts can be electrically isolated from each other or even can be connected by a resistive path via the remainder of the substrate that is longer than in an unaltered configuration, and then the resistive value R3 of the substrate originating from the third measurement between contacts PCi significantly increases. This corresponds to an open circuit, for want of a better term.

An electrical connection, called short circuit, may need to be made between two contacts PCi by depositing, for example, an electrically conductive material between the two contacts.

The resistive value R3 originating from the third measurement is sent to the comparison circuits 10 and 11 in both cases of a breach of the integrity of the substrate, i.e., the completion of an open circuit or a short circuit.

If the resistive value R3 of the substrate originating from the third measurement is greater than a corresponding nominal resistive value of said substrate REFH2, the comparison circuit 10 generates an alarm signal.

If the resistive value R3 of the substrate originating from the third measurement is lower than another corresponding nominal resistive value of said substrate REFB2, the comparison circuit 11 generates an alarm signal.

FIG. 6 schematically shows the first comparison circuit 10 for implementing the first detection of a breach of the integrity of the substrate with respect to the first measurement, previously described with reference to FIG. 3.

After having completed the first measurement, the measured resistive value R1 is sent to a non-inverting input of a comparator COM1.

An inverting input takes as input a first nominal resistive value REFH of the substrate.

The comparator COM1 compares the two values received as input on the two terminals thereof and generates an alarm signal ALR if the resistive value R1 originating from the first measurement is greater than the first nominal resistive value REFH of the substrate.

Thus, if the removal of the electrically conductive wafer is detected, the alarm signal ALR will be generated.

The alarm signal ALR allows, for example, conventional countermeasure means to be triggered that are intended to counteract the attack made on the substrate.

FIG. 7 schematically shows the second comparison circuit 11 for implementing the second detection of a breach of the integrity of the substrate with respect to the second measurement, previously described with reference to FIG. 4.

The measured resistive value R2 originating from the second measurement is sent to an inverting input of a comparator COM2.

A non-inverting input takes as input a second nominal resistive value REFB of the substrate.

The comparator COM2 compares the two values received as input on the two terminals thereof and generates an alarm signal ALR if the resistive value R2 originating from the second measurement is lower than the nominal resistive value REFB of the substrate.

Thus, if thinning of the substrate is detected, the alarm signal ALR will be generated.

Similarly, the alarm signal ALR allows, for example, conventional countermeasure means to be triggered that are intended to counteract the attack made on the substrate.

FIG. 8 schematically shows the two comparison blocks 10 and 11 relative to the third measurement.

After completing the third measurement, the measured resistive value R3 is sent to the non-inverting input of a first comparator COM1 and to the inverting input of a second comparator COM2.

The inverting input of the comparator COM1 receives a third nominal resistive value REFH2 of the substrate.

The non-inverting input of the second comparator COM2 receives another third nominal resistive value REFB of the substrate.

The first comparator COM1 compares the two values received as input on the two terminals thereof and generates an alarm signal ALR if the resistive value R3 originating from the third measurement is greater than the nominal resistive value REFH2 of the substrate.

Thus, if there is an open circuit, the alarm signal ALR will be generated.

The second comparator COM2 compares the two values received as input on the two terminals thereof and generates an alarm signal ALR if the resistive value R3 originating from the third measurement is lower than the nominal resistive value REFB2 of the substrate.

Thus, if there is a short circuit, the alarm signal ALR is generated.

Similarly, the alarm signal ALR allows, for example, conventional countermeasure means to be triggered that are intended to counteract the attack made on the substrate.

Furthermore, the invention is not limited to these embodiments but includes all the variations, for example, of undescribed combinations of contacts that can be used to implement the first, second or third measurements, as well as the use of undescribed known means for implementing said measurements.

The invention claimed is:

1. A method for detecting a breach of the integrity of a semiconductor substrate of an integrated circuit, the semiconductor substrate comprising a front face and a rear face, wherein an electrically conductive wafer is fixed at the rear face, said breach being made from the rear face of the semiconductor substrate, the method comprising:
    detecting a removal of at least one part of said electrically conductive wafer by making a first measurement of a resistive value of the semiconductor substrate between a set of N contacts and the electrically conductive wafer, wherein the set of N contacts are mutually electrically coupled together and distributed over the front face; and
    detecting a thinning of the semiconductor substrate from the rear face by making a second measurement of a resistive value of the semiconductor substrate between a set of M contacts and the electrically conductive wafer, wherein the set of M contacts are mutually electrically coupled together and distributed over the front face.

2. The method according to claim 1, further comprising generating an alarm signal if said resistive value from the first measurement is greater than a first nominal resistive value of said semiconductor substrate.

3. The method according to claim 1, further comprising generating an alarm signal if said resistive value from the second measurement is lower than a second nominal resistive value of said semiconductor substrate.

4. The method according to claim 1, further comprising making a third measurement of a resistive value of the semiconductor substrate between at least two contacts distributed over the front face.

5. The method according to claim 4, further comprising generating an alarm signal if said resistive value originating from the third measurement differs from a third nominal resistive value of the semiconductor substrate.

6. A method for detecting a breach of the integrity of an integrated circuit including a semiconductor substrate comprising a front face and a rear face and an original electrically conductive wafer fixed at the rear face, wherein said breach comprises a removal of at least part of the original electrically conductive wafer, a thinning of the semiconductor substrate from the rear face and a provision of a replacement electrically conductive wafer at a thinned rear face of the semiconductor substrate, the method comprising:
  making a measurement of a resistive value of the semiconductor substrate between a set of contacts at the front face and an electrical connection made to said replacement electrically conductive wafer, wherein the set of contacts are mutually electrically coupled together and distributed over the front face; and
  detecting the breach if the measured resistive value is lower than a nominal resistive value of said semiconductor substrate.

7. The method according to claim 6, further comprising generating an alarm signal in response to detecting the breach.

8. The method according to claim 6, further comprising making a further measurement of a resistive value of the semiconductor substrate between at least two contacts at the front face.

9. The method according to claim 8, further comprising detecting the breach if the further measured resistive value is lower than a further nominal resistive value.

10. The method according to claim 8, further comprising detecting the breach if the further measured resistive value is greater than a further nominal resistive value.

11. An integrated circuit, comprising:
  a semiconductor substrate having a rear face and a front face;
  an electrically conductive wafer fixed on the rear face of the semiconductor substrate;
  a plurality of contacts that are distributed over the front face of the semiconductor substrate; and
  a circuit configured to detect a breach of integrity of said semiconductor substrate from the rear face, wherein the circuit is configured to:
    detect removal of at least one part of said electrically conductive wafer by making a first measurement of a resistive value of the semiconductor substrate between a number N of said contacts that are mutually electrically coupled together and the electrically conductive wafer; and
    detect thinning of the semiconductor substrate from the rear face by making a second measurement of a resistive value of the semiconductor substrate between a number M of said contacts that are mutually electrically coupled together and the electrically conductive wafer.

12. The integrated circuit according to claim 11, wherein the circuit is further configured to generate an alarm signal if said resistive value originating from the first measurement is greater than a first nominal resistive value of said semiconductor substrate.

13. The integrated circuit according to claim 11, wherein the circuit is further configured to generate an alarm signal if said resistive value originating from the second measurement is lower than a second nominal resistive value of the semiconductor substrate.

14. The integrated circuit according to claim 11, wherein the circuit is further configured to make a third measurement of a resistive value of the semiconductor substrate between at least two of said contacts.

15. The integrated circuit according to claim 14, wherein the circuit is further configured to generate an alarm signal if said resistive value originating from the third measurement is either lower than a third nominal resistive value of the semiconductor substrate or is greater than a fourth nominal resistive value of the semiconductor substrate.

16. The integrated circuit according to claim 11, wherein the integrated circuit is a component of an electronic device.

17. The integrated circuit according to claim 16, wherein the electronic device is a smart card.

* * * * *